Patented Sept. 7, 1948

2,449,003

UNITED STATES PATENT OFFICE 2,449,003

WATER-SOLUBLE ESTERS OF RIBOFLAVIN AND PREPARATION OF SAME

Anthony M. Moos, New York, and Sidney D. Upham, Pearl River, N. Y., assignors, by mesne assignments, to American Cyanamid Company, New York, N. Y., a corporation of Maine No Drawing. Application April 9, 1945, Serial No. 587,434

12 Claims. (Cl. 260—211)

This invention relates to new organic compounds and to an improved method of preparing the same. More particularly, the invention relates to riboflavin esters of hydroxy polycarboxylic acids and to a particularly efficient method of preparing esters of riboflavin generally. The invention includes the new esters, the new method, and products containing the new compounds.

Riboflavin is one of the vitamins of the B-complex and is sometimes known as vitamin $B_2$. The compound is very water-insoluble, having a solubility of about 12 mg. in 100 cc. of water at 17.5° C. Inasmuch as it is sometimes desirable to administer the vitamin parenterally, it is necessary that the riboflavin be solubilized to an extent sufficient to make it possible to incorporate a therapeutically effective amount of the vitamin in a reasonable amount of water or other harmless solvent. Although certain derivatives of riboflavin have been made which have improved water-solubility, these compounds still lack the water-solubility desired. Also, the process by which they are prepared is unsatisfactory for several important reasons.

The particular riboflavin esters of the present invention are easily prepared, particularly by the preferred process of the present invention, and have better water-solubility than other known riboflavin derivatives suitable for parenteral administration. Not only do the new esters of the present invention possess an increased solubility, they possess this solubility at a pH range at which solutions are suitable for parenteral administration; that is, between about 5.5 to 7.5. They possess the further advantage of being stable within this pH range, retaining their solubility characteristics and potency for long periods of time. As will be apparent, therefore, these new compounds are particularly suitable for use in the formulation of pharmaceutical preparations in liquid form intended for oral or parenteral administration either alone or in admixture with other vitamins or therapeutic agents.

Although the new compounds of the present invention may be prepared by various methods, a particularly efficient method for their production involves the use of phenol as solvent for the riboflavin and polycarboxylic acid. Solvents such as pyridine have been employed in the production of certain riboflavin esters, but the solubility of riboflavin in pyridine is so low that excessively large amounts of solvent are required. As a result, the process requires a long reaction period and gives low yields of product. While we have discovered that certain solvents, such as glacial acetic acid, are much superior to the use of pyridine, we have found that phenol is even better than glacial acetic acid, giving higher yields of riboflavin esters in a shorter period of time, using relatively small volumes of solvents.

In accordance with the preferred process of the present invention, riboflavin and a suitable polycarboxylic acid are heated in phenol at temperatures within the range of about 100° C. to 185° C. for one hour to about five hours, depending upon the temperature. Ordinarily, substantially equimolecular parts of riboflavin and the polycarboxylic acid are used so that the mono-esters of the polycarboxylic acid and riboflavin are obtained. Riboflavin is quite soluble in phenol, particularly at high temperatures and the reaction medium may contain a relatively high proportion of riboflavin. In one preparation, for example, 450 g. of riboflavin was heated in 1500 cc. of phenol with an hydroxy polycarboxylic acid and an excellent product in high yield was obtained. In general, the esterification may be carried out with one part of riboflavin dissolved in from three parts to about ten parts or more by weight of phenol.

After the reactants have been heated for the desired length of time the riboflavin ester is recovered by evaporation of the phenol under reduced pressure or by pouring the reaction mixture into ether, chloroform, ethylene dichloride, benzene, or other inert organic liquid in which the riboflavin ester is insoluble. The insoluble ester is then recovered and purified by recrystallization as shown in the specific examples.

As will be apparent from the foregoing we may prepare esters of riboflavin of any acid which is soluble in phenol and which will react with riboflavin to form an ester. Although we may prepare by our process certain monoriboflavin esters of polycarboxylic acids, such as succinic acid and phthalic acid, which have better water-solubility than esters of monocarboxylic acids and are valuable compounds we much prefer to prepare riboflavin esters of hydroxy polycarboxylic acids such as citric acid, tartaric acid, malic acid, and other known hydroxy polycarboxylic acids.

The riboflavin esters of the present invention may be used as prepared by the process described herein. Increased solubility may be obtained in some cases, however, by using the mono-esters of polycarboxylic acids in the form of their alkali-metal, ammonium, or amine salts. These salts may be prepared by simple neutralization of the acid ester as shown in the specific examples. Esters having other salt-forming groups may also be prepared but these salts do not have, in general, desirable water-solubility characteristics.

Our invention will now be illustrated by means of the following examples in which are described the preparation of various esters of riboflavin by the process of the present invention. All parts are by weight unless otherwise indicated.

*Example 1*

15.2 g. of citric acid and 29.6 g. of riboflavin were heated in 200 cc. of phenol at 140° C. for 4 hours. The reaction mixture was cooled to 45° C. and poured into 1½ liters of ether with stirring. The precipitated ribocitrate was filtered and triturated with another liter of ether and again filtered. The recovered product which was obtained with a yield of better than 98% of theoretical was dried in the absence of light. Biological assay of the product showed it to be between 55–60% as active as riboflavin itself. This corresponds to an activity of about 90% of theoretical.

The disodium salt of the citric acid ester of riboflavin was prepared by mixing together 4 g. of the riboflavin ester and 1.2 g. of anhydrous sodium acetate in 400 cc. of warm ethyl alcohol, concentrating the solution under reduced pressure to about 50 cc., and recovering the crystallized disodium salt from solution. The solubility of this disodium salt in water at room temperature was found to be over 1,165 mg. per 100 cc. This compares with 282 mg. per 100 cc. under the same conditions for the sodium salt of the succinic acid ester of riboflavin and 100 mg. per 100 cc. for the phthalic acid ester of riboflavin.

The stability of the disodium riboflavin citrate was tested by keeping solutions containing 11.65 mg. of the esters per cc. of water at 5° C., at room temperature and at 42° C. for a period of 5 weeks. In no case was a precipitate formed nor did the potency of the ester drop significantly during this time.

*Example 2*

15.4 g. of riboflavin and 8.6 g. of citric acid were suspended in 1500 cc. of glacial acetic acid and the reaction mixture heated at reflux temperature for 6 hours with constant stirring. The glacial acetic acid was then removed by evaporation under reduced pressure and the residue, containing the mono-riboflavin ester of citric acid, was dissolved in 1500 cc. of alcohol. The product was recovered by crystallization from an ethyl alcohol-ethyl acetate mixture. The disodium salt of this ester was prepared in the same manner as shown in Example 1.

Although the use of glacial acetic acid in this example is an improvement over pyridine in that larger amounts of riboflavin can be incorporated in the reaction medium and more product can be obtained with a given volume of solvent in a much shorter period of time, it will be seen that glacial acetic acid is not nearly as satisfactory as phenol, the preferred solvent of the present invention.

*Example 3*

3.7 g. of riboflavin and 1.9 g. of citric acid were heated in 50 cc. of phenol for 4 hours at 130° C. The hot solution was poured into ether and a precipitate recovered by filtration. The precipitated material was then dissolved in hot alcohol after which the solution was evaporated to a small volume. Upon addition of ether to the concentrated solution a light colored precipitate of a citric acid ester of riboflavin came out of solution. This product was recovered with a yield of 95% of theoretical. The dried product on biological assay was found to contain 52% of usable riboflavin which compares favorably with a theoretical riboflavin content of 67%.

*Example 4*

3.7 g. of riboflavin and 1.3 g. of malic acid were dissolved in 50 cc. of phenol and heated between 120 to 130° C. for 2 hours. The hot solution was poured into 500 cc. of ether and the precipitated malic acid ester of riboflavin was recovered by filtration. The ester was triturated with alcohol to remove any phenol that might have been present. The malic acid ester was recovered with a yield of 98% of theoretical and on assay was found to contain 70% of available riboflavin which compares favorably with a theoretical riboflavin content of 76%.

We claim:

1. A method of preparing polycarboxylic acid esters of riboflavin which comprises heating riboflavin and a polycarboxylic acid in phenol at a temperature within the range of 100° to 185° C.

2. A method of preparing hydroxy polycarboxylic esters of riboflavin which comprises heating riboflavin and an hydroxy polycarboxylic acid in phenol at a temperature within the range of 100° to 185° C.

3. A method of preparing citric acid esters of riboflavin which comprises heating riboflavin and citric acid in phenol at a temperature within the range of 100° to 185° C.

4. A method of preparing malic acid esters of riboflavin which comprises heating riboflavin and malic acid in phenol at a temperature within the range of 100° to 185° C.

5. A method of preparing tartaric acid esters of riboflavin which comprises heating riboflavin and tartaric acid in phenol at a temperature within the range of 100° to 185° C.

6. The citric acid ester of riboflavin.

7. The malic acid ester of riboflavin.

8. The tartaric acid ester of riboflavin.

9. The method of preparing dicarboxylic acid esters of riboflavin which comprises heating riboflavin and a dicarboxylic acid in phenol at a temperature within the range of 100° to 185° C.

10. The method of preparing tricarboxylic acid esters of riboflavin which comprises heating riboflavin and a tricarboxylic acid in phenol at a temperature within the range of 100° to 185° C.

11. The process which comprises reacting riboflavin with citric acid in the presence of a phenol at the temperature within the range of 100 to 185° C.

12. A riboflavin ester of an acid from the group consisting of citric, malic, and tartaric acids.

ANTHONY M. MOOS.
SIDNEY D. UPHAM.

REFERENCES CITED

The following references are of record in the file of this patent:

UNITED STATES PATENTS

| Number | Name | Date |
|---|---|---|
| 2,332,075 | Gustus | Oct. 19, 1943 |
| 2,358,356 | Stein et al. | Sept. 19, 1944 |